April 30, 1940.  N. D. LOWE  2,198,943
FISH SCREEN CLEANING DEVICE
Filed Sept. 5, 1939
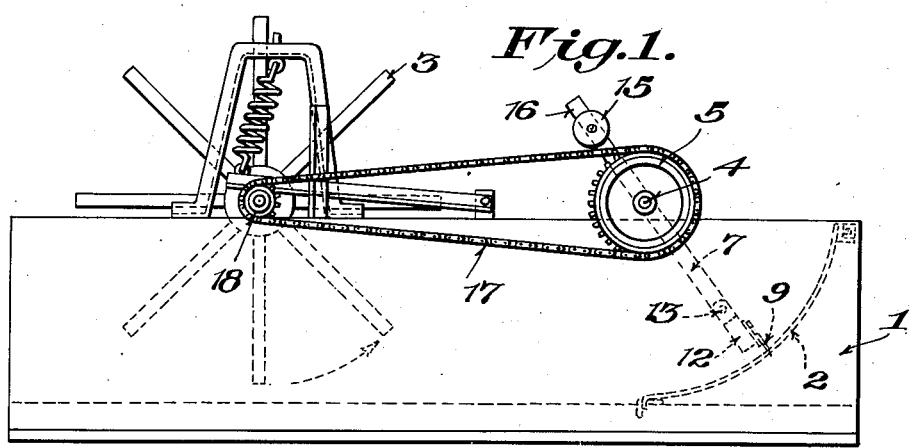
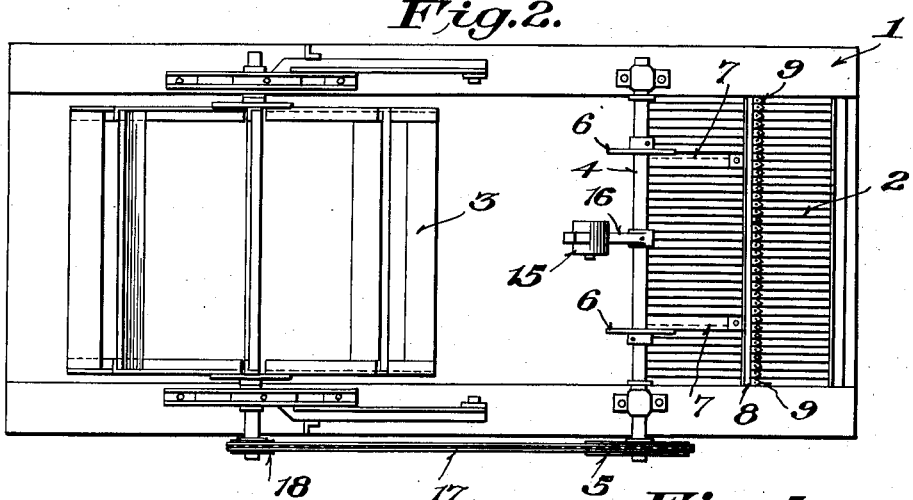
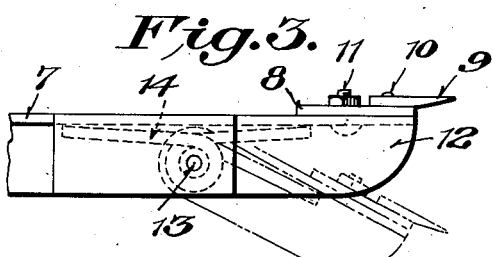
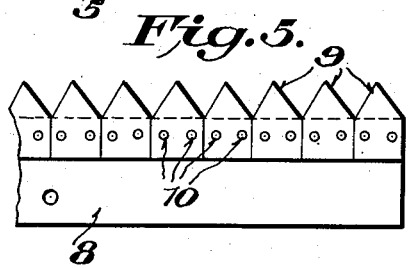
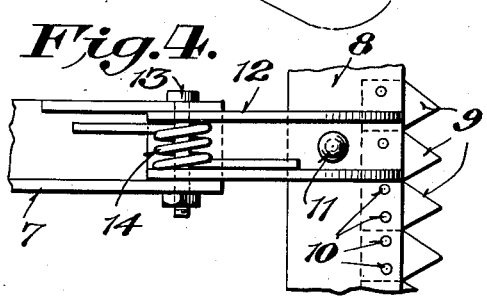
Inventor
Nolan D. Lowe,
By Russ & Geier
Attorneys Patented Apr. 30, 1940

2,198,943

UNITED STATES PATENT OFFICE 2,198,943

FISH SCREEN CLEANING DEVICE

Nolan D. Lowe, Franklin, Idaho

Application September 5, 1939, Serial No. 293,493

6 Claims. (Cl. 210—176)

This invention relates to fish screen cleaning devices, and the primary object thereof is to provide improved means for maintaining the sluice screen clean, and free of debris, and for depositing the latter on the downside of the stream.

The invention further aims to provide a cleaning and cutting device, which conforms itself to the contour of the screen, whereby to more effectively perform its cleaning function by even scraping of the surface of the screen.

The invention also aims to provide improved means for driving the cleaning device, and to also simplify the latter so as to minimize the power required to drive the same, and thereby to assure constant operations thereof.

Still further, the invention aims to provide a cleaning and cutting device which is yieldable in preventing clogging, when larger objects are encountered, such as stones, sticks, beaver cuttings, etc., thereby to prevent injury or breakage of the parts.

The invention has still further and other objects, which will be later set forth and manifested in the course of the following.

In the drawing:

Fig. 1 is a side elevation of the invention;

Fig. 2 is a top plan view;

Fig. 3 is a fragmentary view, in side elevation of the cleaning and cutter element, and its mounting;

Fig. 4 is a bottom plan view of Fig. 3;

Fig. 5 is a fragmentary bottom plan view of the cleaning and cutting cutter element;

Fig. 6 is a fragmentary top plan view of a modified form of cleaning and cutting element.

The sluice 1, in connection with which the invention is employed, is equipped with a concave screen 2 and with a rotatable paddle wheel 3, the mounting of which forms no part of the instant invention, and may be of any desired type, such as disclosed in my patent, No. 2,074,407, March 23, 1937.

The invention resides in the cleaning element which has wiping, and consequently scraping action upon or with the concave surface of the screen; also a cutting action to cut and dislodge twigs, moss, and other debris entering the sluice.

For the purpose of mounting the cutting and cleaning element, for rotary movements, a shaft 4, is journaled on the sluice, and disposed in spaced relation to the paddle wheel 3. A gear 5, is rigidly connected to the shaft for movement therewith. Disks 6, are rigidly secured to the shaft 4, and have relatively short inner radial arms 7, rigidly secured thereto.

The cleaning and cutting element is composed of a strip or bar 8, which carries a series of substantially V-shaped cutters 9, secured to and transversely of the strip or bar by any suitable means, such as rivets 10. The strip or bar 8, is secured by means of nuts 11, to short outer radial channeled arms 12, which latter are received within, and pivoted at 13, to the inner channeled arms 7 and are tensioned by means of coil springs 14, in order to yieldably mount the outer arms 12 so that same can give upon encountering abnormal constructions, and thus not subject the parts to strains which might result in damage or breakage. Due to nesting of the outer arms 12, within the inner arms 7, and to their channeled formation, the bottoms of the outer arms will abut those of the inner arms, and the latter will hold the outer arms in cleaning position, while still permitting downward yielding thereof.

In order to counterbalance the weight of the cleaning element and its mounting, an adjustable counterweight 15 is secured to the shaft 4, by means of an arm 16, secured to and disposed radially of the shaft 4, and diametrically opposite to the radial arms and centrally between the latter, so as to provide smoother and easier operation of the parts. The gear 5 is driven by a sprocket chain 17, which latter is driven by a pinion 18, rigidly secured to the shaft of the paddle wheel.

In Fig. 6, an optional form of scraper cutter and cleaner element is shown, which consists of a series of relatively short rod-like links 19, hingedly connected by short links 20, in end to end relation. The links 19 are each formed with spiral-like ribs 21, that have sharp edges for the purpose of removal by cutting of any deposits, which may adhere to the screen.

As shown in Fig. 6, the cleaner element may be attached at its ends to the arms 12, by bolts 22, or other means, whereby to support the element for free turning movements.

The flexible element cannot only conform itself to the screen surface, but the links 19, can also turn or twist during its effective or upward cleaning movement, and thus more effectively cut and dislodge debris which accumulates on the screen.

Since the paddle, which lies rearwardly of the cutter and cleaner element, enters into action immediately following that of the latter, all debris lifted by the element will be moved upwardly on the screen and finally deposited on the down stream end of the sluice. Twigs, moss, leaves, beaver cuttings, and other encountered debris, will also be cut and thus more easily dislodged, to enable easier lifting thereof by the cleaner element.

What is claimed is:

1. A cleaning device for sluices having a screen, and a paddle wheel, including a rotary shaft carried by the sluice and spaced from the wheel, a flexible element, means to connect each of the ends of the flexible element to the shaft with the intermediate portion of the element free and loose so as to be capable of conforming itself to the surface of the screen, and means to drive the shaft from the wheel.

2. A cleaning device in accordance with claim 1, wherein the flexible element consists of a series of rod-like links hingedly connected to each other.

3. A cleaning device in accordance with claim 1, wherein the flexible element consists of a series of rod-like links hingedly connected in end-to-end relation and having peripheral cutting edges.

4. A cleaning device in accordance with claim 1, wherein the flexible element consists of a series of rod-like links hingedly connected to each other in end-to-end relation and having peripheral spiral-like cutting ribs.

5. A cleaning device in accordance with claim 1, wherein the connecting means for the flexible element each include pivoted and spring tensioned elements whereby to allow the flexible element to yield upon encountering abnormal obstructions.

6. A cleaning device for sluices having a screen and a paddle wheel, including a rotary shaft carried by the sluice and spaced from the wheel, means to drive the shaft from the wheel, means to mount the cleaning element for movement with the shaft comprising spaced inner radial arms having their outer ends of U-shape in cross section and rigidly secured at their inner ends to the shaft, outer arms pivoted to the inner arms between the confronting sides of the latter and having portions to engage the closed side of the U-shaped arms, coil springs mounted on the pivots and engaged with each of the arms so as to hold the outer arms normally in engagement with the closed side of the U-shaped arms, but to provide for yielding of the outer arms upon encountering abnormal obstructions, and a cutting and cleaning element carried by the outer arms for engagement with the screen.

NOLAN D. LOWE.